US008677495B1

(12) United States Patent
Yang et al.

(10) Patent No.: US 8,677,495 B1
(45) Date of Patent: Mar. 18, 2014

(54) DYNAMIC TRAP FOR DETECTING MALICIOUS APPLICATIONS IN COMPUTING DEVICES

(75) Inventors: Shun-Fa Yang, Taipei (TW); Chung-Tsai Su, Xindian (TW)

(73) Assignee: Trend Micro Incorporated, Tokyo (JP)

( * ) Notice: Subject to any disclaimer, the term of this patent is extended or adjusted under 35 U.S.C. 154(b) by 21 days.

(21) Appl. No.: 13/479,600

(22) Filed: May 24, 2012

(51) Int. Cl.
*G06F 21/00* (2013.01)
(52) U.S. Cl.
USPC ............................................. 726/24; 709/224
(58) Field of Classification Search
USPC ....................................................... 726/22–24
See application file for complete search history.

(56) References Cited

U.S. PATENT DOCUMENTS

| | | | |
|---|---|---|---|
| 5,966,702 A | 10/1999 | Fresko et al. | |
| 5,983,348 A | 11/1999 | Ji | |
| 6,272,641 B1 | 8/2001 | Ji | |
| 6,363,489 B1 * | 3/2002 | Comay et al. | 726/22 |
| 7,950,060 B1 * | 5/2011 | Kennedy et al. | 726/24 |
| 2003/0154394 A1 * | 8/2003 | Levin | 713/200 |
| 2007/0240215 A1 * | 10/2007 | Flores et al. | 726/24 |
| 2009/0119402 A1 * | 5/2009 | Shull et al. | 709/224 |
| 2009/0241187 A1 * | 9/2009 | Troyansky | 726/22 |
| 2010/0024034 A1 * | 1/2010 | Cohen | 726/24 |

OTHER PUBLICATIONS

Dumiak, M., "Setting bait to track data thieves," Spectrum, IEEE , vol. 46, No. 5, pp. 11,12, May 2009.*

Lei Liu and Songqing Chen "Malyzer: Defeating Anti-detection for Application-Level Malware Analysis", 2009, pp. 201-218, Dept. of Computer Science, George Mason University.
Dalvik (software)—From Wikipedia, the free encyclopedia, 1 sheet [retrieved on Mar. 28, 2012], retrieved from the internet: http://en.wikipedia.org/wiki/Dalvik_(software).
ProGuard Main, 1 sheet [retrieved on Apr. 3, 2012], retrieved from the internet: http://proguard.sourceforge.net/main.html.
ProGuard / Android Developers, 3 sheets [retrieved on Apr. 3, 2012], retrieved from the internet: http://developer.android.com/guide/developing/tools/proguard.html.
Application Fundamentals / Android Developers, 7 sheets [retrieved on Mar. 28, 2012], retrieved from the internet: http://developer.android.com/guide/topics/fundamental.html.
Github:gist—A reflection hack to override the APK ClassLoader so you can launch Activities in an external JAR, 2 sheets [retrieved on Apr. 16, 2012], retrieved from the internet: https://gist.github.com/839003.

\* cited by examiner

*Primary Examiner* — Farid Homayounmehr
*Assistant Examiner* — Zhimei Zhu
(74) *Attorney, Agent, or Firm* — Okamoto & Benedicto LLP

(57) ABSTRACT

A trap is dynamically created in a computing device to detect a malicious application. The trap may be a fake e-mail address created in response to detecting running of an application in the computing device. The fake e-mail address includes a local-part that identifies the application and identifies the mobile computing device (e.g., by user identifier). A backend system receives e-mails that are addressed to fake e-mail addresses. The backend system parses a recipient address of a received e-mail to identify an application associated with the e-mail and the computing device where the fake e-mail address was generated. The backend system informs a user of the computing device of a data leakage occurring in the computing device and the application that may be responsible for the data leakage.

18 Claims, 4 Drawing Sheets

US 8,677,495 B1

DYNAMIC TRAP FOR DETECTING MALICIOUS APPLICATIONS IN COMPUTING DEVICES

BACKGROUND OF THE INVENTION

1. Field of the Invention

The present invention relates generally to computer security, and more particularly but not exclusively to methods and apparatus for detecting malicious applications.

2. Description of the Background Art

Malicious codes may be detected using traditional antivirus algorithms, such as pattern matching and behavior monitoring. Pattern matching involves using a scanner to match contents of a file or other data against signatures of known malicious codes. Although effective in detecting malicious codes, pattern matching is processor-intensive and requires a relatively large storage space to store the signatures. Like pattern matching, behavior monitoring consumes a relatively large amount of computing resources to be able to monitor and make decisions on particular activities of application programs ("applications") being monitored. In addition, behavior monitoring may result in a large number of false positives, i.e., declaring an application to be malicious when it is actually not.

The above problems are exacerbated when pattern matching or behavior monitoring is employed in a low resource computer, such as a mobile computing device. Compared to a regular computer, such as a desktop or laptop computer, a typical mobile computing device has low memory and processing resources. As a result, algorithms for detecting malicious codes in regular computers may not be suitable for use in mobile computing devices.

SUMMARY

In one embodiment, a trap is dynamically created in a computing device to detect a malicious application. The trap may be a fake e-mail address created in response to detecting running of an application in the computing device. The fake e-mail address may include a local-part that identifies the application and identifies the mobile computing device (e.g., by user identifier). A backend system receives e-mails that are addressed to fake e-mail addresses. The backend system parses a recipient address of a received e-mail to identify a detected application and the computing device where the fake e-mail address was generated. The backend system informs a user of the computing device of a data leakage occurring in the computing device and the name of the application that may be responsible for the data leakage.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
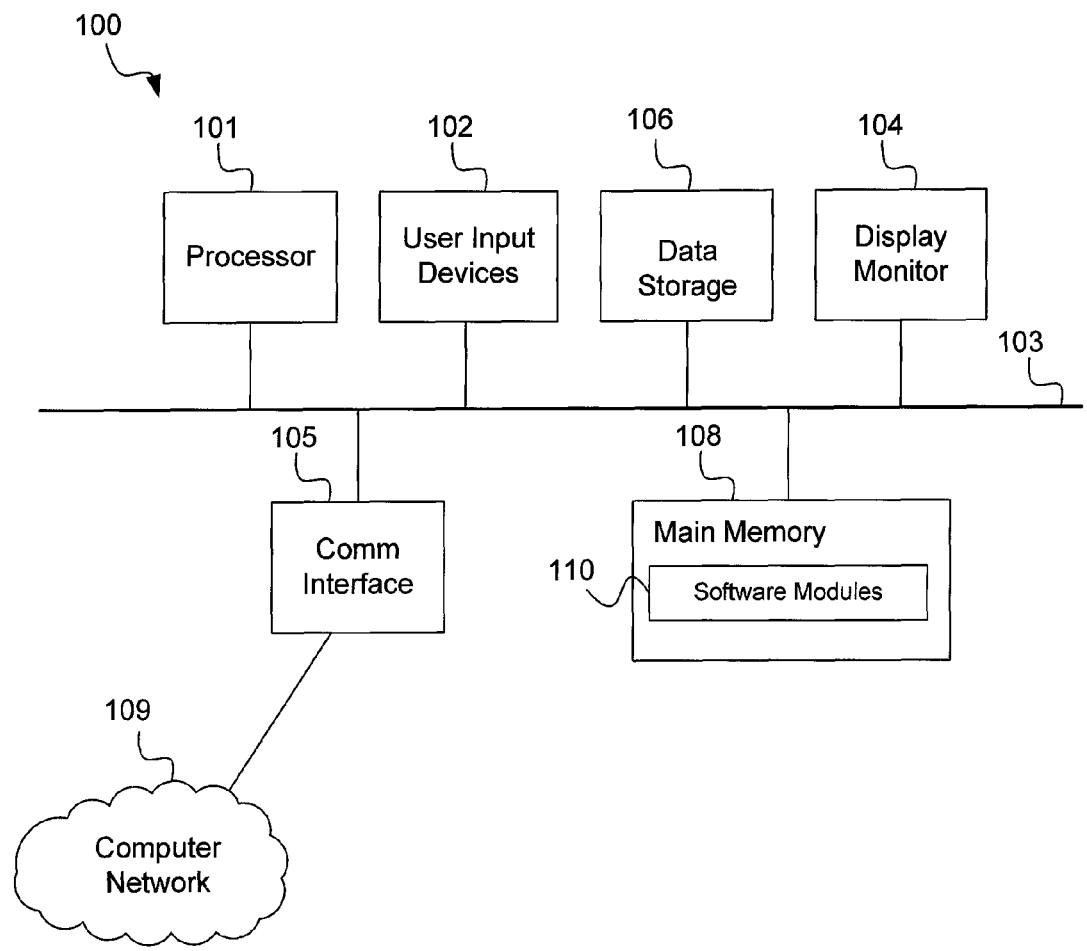
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as any of the computers described below. The computer 100 may have fewer or more components to meet the needs of a particular application. The computer 100 may include a processor 101. The computer 100 may have one or more buses 103 coupling its various components. The computer 100 may include one or more user input devices 102 (e.g., touch screen, keyboard, mouse), one or more data storage devices 106 (e.g., hard drive, optical disk, USB memory), a display monitor 104 (e.g., LCD, flat panel monitor, CRT), a communications interface 105 (e.g., network adapter, modem, cellular interface), and a main memory 108 (e.g., RAM). The communications interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. For example, the software modules 110 may comprise a monitor agent 223, a mobile operating system 227, and one or more applications 224 when the computer 100 is employed as a mobile computing device 220 (see FIG. 2). As another example, the software modules 110 may comprise a mail server 225 when the computer 100 is employed as a backend system 230 (see FIG. 2).

The computer 100 may be configured to perform method steps by executing the software modules 110. The software modules 110 may be loaded from the data storage device 106 to the main memory 108. The software modules 110 may also be made available on other computer-readable storage medium including optical disk, flash drive, and other memory devices.

Figure 2:
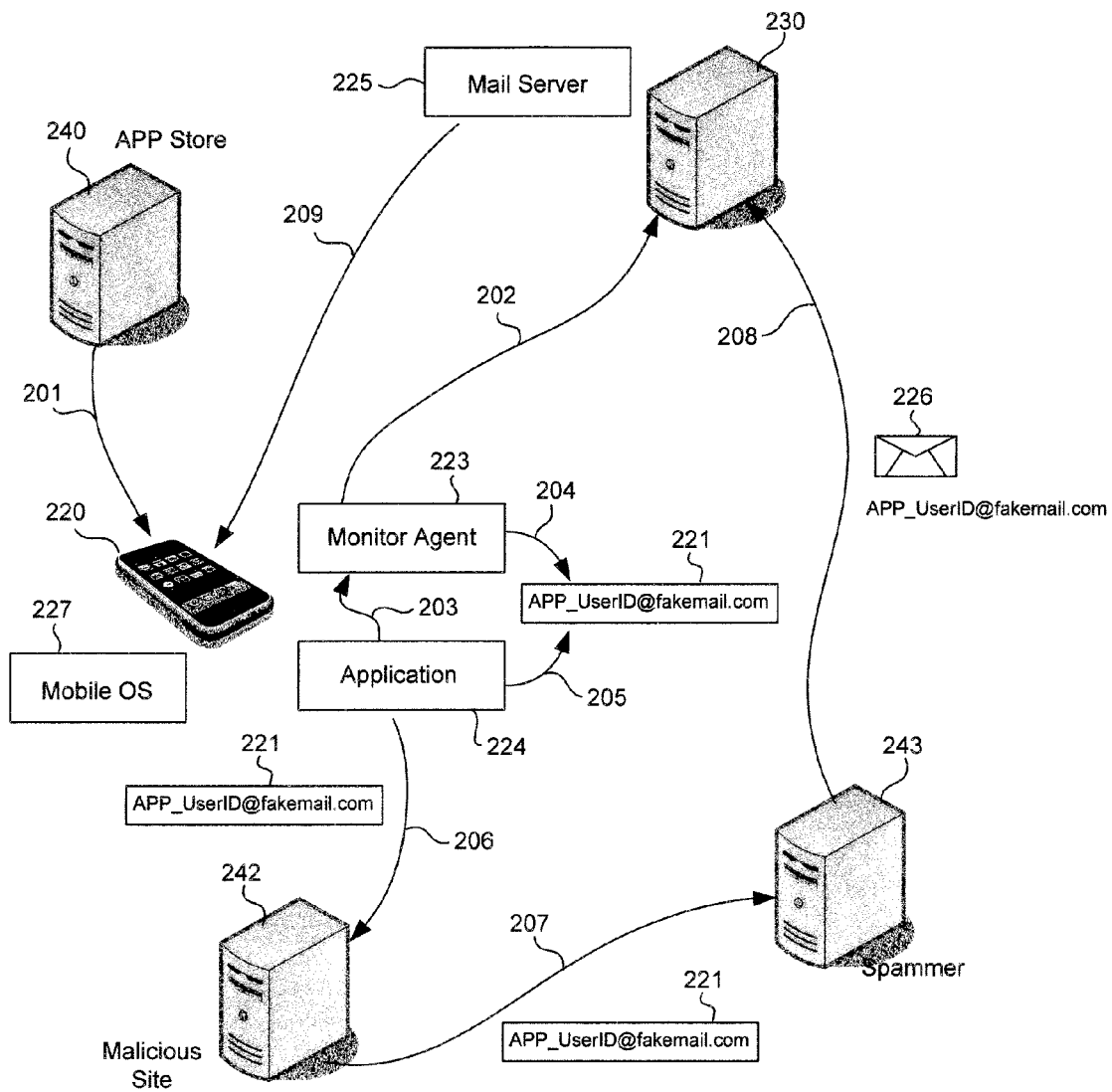
FIG. 2 shows a flow diagram of a method of detecting malicious applications in computing devices in accordance with an embodiment of the present invention.

FIG. 2 shows a flow diagram of a method of detecting malicious applications in computing devices in accordance with an embodiment of the present invention. As will be more apparent below, the method involves creating a dynamic trap, which may be in the form of a fake e-mail address, in the mobile computing device 220 and detecting the dynamic trap in the backend system 230. The trap is dynamic in that it is not created in advance, but rather in response to detecting running of an application. In the example of FIG. 2, the method is performed by a system comprising the mobile computing device 220 and the backend system 230.

The mobile computing device 220 may be a mobile phone or a tablet, for example. The mobile computing device 220 may be running the monitor agent 223, the mobile operating system 227, and one or more applications 224. The mobile operating system 227 may comprise the ANDROID operating system, for example. More specifically, the mobile computing device 220 may comprise an ANDROID mobile phone or ANDROID tablet.

In general, a mobile operating system is designed to be suitable for computing devices that are constrained in terms of memory and processor speed. Embodiments of the present invention are especially useful when employed in mobile computing devices as they allow for detection of malicious codes even with the constraints of a mobile operating system and low computing resources. It is to be noted, however, that embodiments of the present invention may also be employed in regular computers.

In the example of FIG. 2, the mobile computing device 220 receives the monitor agent 223 from a computer system 240 hosting an application store (arrow 201). The mobile computing device 220 may also receive the monitor agent 223 from other sources. The monitor agent 223 may comprise computer-readable program code configured to register with the backend system 230, to monitor for and detect a running application 224, and to dynamically create a trap associated with the application 224 in response to detecting that the application 224 is running. The trap may comprise a fake e-mail address 221.

Upon installation in the mobile computing device 220, the monitor agent 223 connects to the backend system 230 for registration (arrow 202). The computing device 220, the backend system 230, and other computing devices shown in FIG. 2 may communicate over the Internet. In one embodiment, as part of the registration process, the monitor agent 223 provides that backend system 230 a user identifier, such as a User ID, for identifying the mobile computing device 220 where the monitor agent 223 is installed. Also as part of the registration process, the monitor agent 223 provides the backend system 230 the contact information of the user of the mobile computing device 220. The contact information may be an e-mail address of the user, for example. The contact information allows the mail server 225 hosted by the backend system 230 to warn the user of data leakage and a possible malicious application in the mobile computing device 220 when the mail server 225 receives an e-mail that is addressed to the fake e-mail address 221. The monitor agent 223 may prompt the user for a user identifier and an e-mail address, both of which are provided by the monitor agent 223 to the backend system 230.

An application 224 comprises an application program, which may or may not be malicious. Applications for mobile computing devices, which are also referred to as "APPs," may be obtained from a variety of sources, including APP stores. Because of a large number of available free APPs, there is a tendency for mobile computing device users to download and try APPs on impulse, often ignoring the security ramifications of receiving APPs over the Internet. A growing concern is the increase in the number of malicious APPs that steal data from mobile computing devices. Examples of data that may be stolen include e-mail addresses from contact lists, credit card information, and passwords. Stolen e-mail addresses may be sold to or used by spammers to send spam e-mail. Worse, stolen e-mail addresses may be used for phishing or to perpetrate other frauds on the owner of the e-mail address because the e-mail address may have been stolen by the malicious APPs along with the actual name and other contact information of the e-mail address owner.

The monitor agent 223 monitors for an application 224 that is running on the mobile computing device 220. In the example of FIG. 2, the monitor agent 223 detects running of an application 224 (arrow 203), which is newly launched in the mobile computing device 220. The monitor agent 223 may detect running applications by using an application programming interface (API) of the mobile operating system 227, for example. A running application 224 may be identified by its process name, which may be obtained by hooking, monitoring, or enumerating process management, for example. In response to detecting launching of the application 224, the monitor agent 223 creates a fake e-mail address 221 associated with the application 224 (arrow 204). As can be appreciated, an e-mail address comprises a local-part before the @ sign and a domain name to which the e-mail will be sent to after the @ sign. In one embodiment, the monitor agent 223 creates the fake e-mail address 221 with the domain name of the mail server 225 and a local-part that identifies the mobile computing device 220 and the detected running application 224. In the example of FIG. 2, the fake e-mail address 221 has the format:

APP_UserID@fakemail.com where "APP" identifies the detected running application 224, "UserID" identifies the mobile computing device 220, and "fakemail.com" is the domain name of the mail server 225. The application 224 may be identified by its process name in the local-part.

The fake e-mail address 221 is a fake in that it is a fictitious e-mail that has been created to detect malicious applications. The fake e-mail address 221 does not belong to any contact of the user. Because the fake e-mail address 221 has been dynamically created by the monitor agent 223 for detecting malicious applications and is not an e-mail address of a contact of the user, there is no legitimate reason for seeing the fake e-mail address 221 outside of the mobile computing device 220. That is, receiving an e-mail having the fake e-mail address 221 as a recipient address indicates that the fake e-mail address 221 has somehow been stolen from the mobile computing device 220 and that data leakage is occurring in the mobile computing device 220. In the example of FIG. 2, the fake e-mail address 221 has the domain name of the mail server 225 to allow the mail server 225 to receive e-mails addressed to the fake e-mail address 221. The monitor agent 223 stores the fake e-mail address 221 in the mobile computing device 220. In one embodiment, the monitor agent 223 includes the fake e-mail address 221 in a contact list in the mobile computing device 220.

In one embodiment, the monitor agent 223 does not create the fake e-mail address 221 before detection of a running application 224. This helps ensure that the fake e-mail address 221 is made available only after an application 224 has been detected to be running, making it easier to correlate theft of the fake e-mail address 221 with the running of the application 224.

In the example of FIG. 2, the detected running application 224 comprises malicious code configured to steal data from the mobile computing device 220. The running application 224 finds the fake e-mail address 221 (arrow 205), e.g., from a contact list, and retrieves or copies the fake e-mail address 221 along with other stolen data. The application 224 forwards the stolen data, which include the fake e-mail address 221, to a malicious site hosted by a computer system 242 (arrow 206). The fake e-mail address 221 may be sold or otherwise provided to a spammer site hosted by a computer system 243 (arrow 207). The spammer site sends one or more spam or phishing e-mails having the fake e-mail address 221 as the recipient address. In the example of FIG. 2, the spammer sent a spam e-mail 226 addressed to the fake e-mail address 221 (arrow 208).

The backend system 230 may comprise one or more computers. The backend system 230 may comprise a server computer system hosting the mail server 225, for example. The mail server 225 may comprise computer-readable program code configured to receive e-mails addressed to fake e-mail addresses 221 created by a monitor agent 223, and to analyze the recipient address of received e-mails to identify the mobile computing device 220 where the fake e-mail address 221 was created and the application associated with the fake e-mail address.

In the example of FIG. 2, the mail server 225 receives the e-mail 226 sent by the spammer (arrow 208). The mail server 225 parses the e-mail 226 to extract its recipient address, which in this example is the fake e-mail address 221. In one embodiment, the mail server 225 analyzes the fake e-mail address 221 by extracting its local-part, which in this example includes an identifier of the application 224 associated with the fake e-mail address 221 and a user identifier. Because the fake e-mail address 221 is not an e-mail address of a real contact of the user, receiving the e-mail 226 addressed to the fake e-mail address 221 indicates that data leakage is occurring in the mobile computing device 220. Furthermore, because the application 224 identified in the fake e-mail address 221 was the application that was running in the mobile computing device 220 when the fake e-mail address 221 was created by the monitor agent 223, the identified application 224 is highly suspicious.

In one embodiment, the mail server 225 deems the application 224 identified in the fake e-mail address 221 to be malicious. Accordingly, the mail server 225 retrieves the contact information of the user of the mobile computing device 220 identified in the fake e-mail address 221, and sends a notification to the user (arrow 209). For example, the mail server 225 may send an e-mail with the notification to the e-mail address of the user provided during registration of the monitor agent 223. The notification may inform the user that data leakage is occurring in the mobile computing device 220 and that the application 224 identified in the fake e-mail address 221 may be malicious. As can be appreciated, there is much value to the user in knowing that data in the mobile computing device 220 are compromised. The user may take a responsive action to scan for malicious codes not just the identified application 224 but also other applications on the mobile computing device 220.

As a particular example, the monitor agent 223 may detect that an application APP1 is running on the mobile computing device 220. In response to the detection, the monitor agent 223 may create a fake e-mail address 221 associated with the application APP1 as follows:

APP1_UserID@fakemail.com where "APP1" identifies the application APP1, "UserID" identifies the mobile computing device 220, and "fakemail.com" is the domain name of the mail server 225. The mail server 225 does not receive an e-mail that has the fake e-mail address 221 associated with the application APP1 as a recipient address.

It is to be noted that a typical malicious application may steal data after a relatively short period of time, so the fake e-mail address 221 associated with an application does not have to be kept for a long time. For example, after 10 minutes (or shorter) of creating the fake e-mail address 221, the fake e-mail address 221 may be changed to be associated with another application. In that embodiment, only one fake e-mail address 221, the last one created, is present in the mobile computing device 220 at any time. This helps alleviate any performance issues that may result in keeping track of multiple fake e-mail addresses 221.

After a period of time, the user may install and run another application APP2. In response to detecting the running of the application APP2, the monitor agent 223 may change the fake e-mail address 221 to be associated with the application APP2, instead of with the application APP1, as follows:

APP2_UserID@fakemail.com where "APP2" identifies the application APP2, "UserID" identifies the mobile computing device 220, and "fakemail.com" is the domain name of the mail server 225. This time, however, the mail server 225 receives a spam e-mail having the recipient address "APP2_UserID@fakemail.com". The mail server 225 parses the local-part of the recipient address to identify the application APP2 and the UserID of the user of the mobile computing device 220. The mail server 225 sends an e-mail to the user, notifying the user that the application APP2 may have stolen data from the computing device 220, and that it is advisable to check the mobile computing device 220 for malicious codes.

Figure 3:
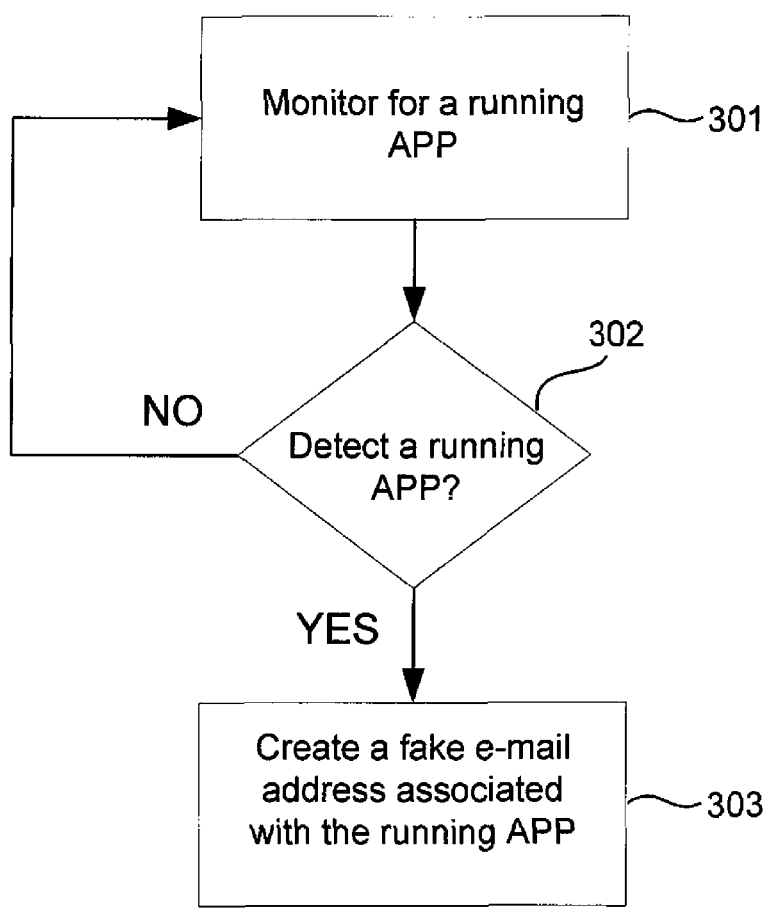
FIG. 3 shows a flow diagram of a method of creating a dynamic trap for detecting malicious codes in computing devices in accordance with an embodiment of the present invention.

FIG. 3 shows a flow diagram of a method of creating a dynamic trap for detecting malicious codes in computing devices in accordance with an embodiment of the present invention. The method of FIG. 3 may be performed by the monitor agent 223, for example. Other components may also be employed without detracting from the merits of the present invention.

In the example of FIG. 3, the monitor agent 223 monitors for a running application 224 (step 301). In response to detecting a newly launched application 224 running in the mobile computing device 220, the monitor agent 223 creates a fake e-mail address 221 associated with the detected running application 224 (step 302 to step 303). Otherwise, the monitor agent 223 continues monitoring for a running application 224 (step 302 to step 301). In one embodiment, the monitor agent 223 does not create a fake e-mail address 221 associated with an application 224 until after that application 224 has been detected by the monitor agent 223 to be running. This increases the probability that the application 224 is the application that stole the fake e-mail address 221 when an e-mail addressed to the fake e-mail address 221 is received by the mail server 225. The monitor agent 223 continues monitoring for other running applications 224.

Figure 4:
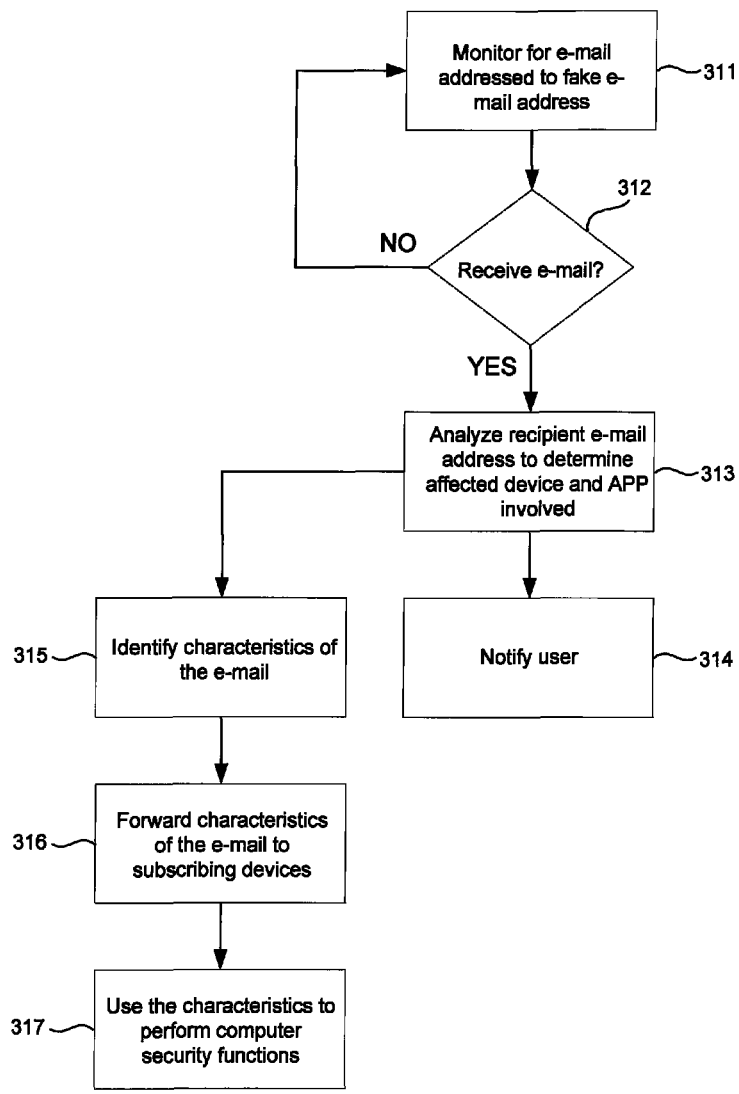
FIG. 4 shows a flow diagram of a method of receiving data stolen from computing devices in accordance with an embodiment of the present invention.

FIG. 4 shows a flow diagram of a method of receiving data stolen from computing devices in accordance with an embodiment of the present invention. The method of FIG. 4 may be performed by the backend system 230 running the mail sever 225, for example. Other components may also be employed without detracting from the merits of the present invention. In the example of FIG. 4, the backend system 230 detects data leakage in the mobile computing device 220.

In the example of FIG. 4, the mail server 225 monitors for e-mails addressed to a fake e-mail address 221 (step 311). In response to receiving an e-mail addressed to a fake e-mail address 221 (step 312 to step 313), the mail server 225 extracts the recipient address of the received e-mail, which is a fake e-mail address 221, to determine the affected computing device and the application involved (step 313). In one embodiment, the mail server 225 parses the recipient address to extract the user identifier and name of the application 224 from the local-part of the fake e-mail address 221. The user identifier identifies the user, allowing the mail server 225 to obtain the contact information of the user, which may have been obtained through a registration process. The name of the application 224 identifies the particular application 224 that may have stolen the fake e-mail address 221 from the computing device of the user. The mail server 225 notifies the user about the data leakage occurring in his computing device and the application 224 that may be responsible for the data leakage (step 314). The mail server 225 continues to monitor for other e-mails having a fake e-mail address 221 as a recipient to detect data leakage in other computing devices.

Optionally, information obtained by the mail server 225 by analyzing received e-mails may be employed for other computer security functions including for anti-spam, anti-phishing, etc. This is particularly advantageous in this instance because e-mails that are addressed to fake e-mail addresses 221 are highly likely to be malicious e-mails. As a particular example, the mail server 225 may identify characteristics of a received e-mail (step 315), including the e-mail's subject line, message body, recipient addresses, sender address, and so on. The mail server 225 or other module may provide the characteristics to computing devices that subscribe to receive updates to computer security functions (step 316). A computing device receiving the characteristics (e.g., as an update to a pattern file) may use the characteristics to perform a computer security function (step 317). For example, the monitor agent 223 may receive the characteristics and use the characteristics to determine whether or not an e-mail received in the mobile computing device 220 is spam by comparing the characteristics to the subject line, message body, recipient addresses, and/or sender address of the received e-mail.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
   detecting running of an application in a mobile computing device;
   in response to detecting the running of the application in the mobile computing device, creating a fake e-mail address that includes a local-part identifying the application;
   storing the fake e-mail address in the mobile computing device;
   receiving an e-mail that has the fake e-mail address as a recipient address;
   parsing the fake e-mail address to identify the application; and
   sending a notification to a user of the mobile computing device.

2. The method of claim 1 wherein the fake e-mail address is included in a contact list in the mobile computing device.

3. The method of claim 1 wherein the mobile computing device comprises a mobile phone.

4. The method of claim 1 wherein the notification informs the user of data leakage in the mobile computing device.

5. The method of claim 4 wherein the notification informs the user that the application may be responsible for the data leakage.

6. The method of claim 1 further comprising:
   in response to detecting the running of the application in the mobile computing device, creating the fake e-mail address that includes the local-part identifying the application and the local part identifying the mobile computing device.

7. The method of claim 6 wherein the mobile computing device is identified in the local-part by a user identifier.

8. A system comprising:
   a mobile computing device running a mobile operating system, the mobile computing device monitoring for running of an application, detecting the running of the application in the mobile computing device, and creating a fake e-mail address associated with the application in response to detecting the running of the application in the mobile computing device; and
   a backend system receiving an e-mail, analyzing a recipient address of the e-mail to identify the fake e-mail address, and sending a notification to a user of the mobile computing device in response to receiving the e-mail, the notification indicating to the user a data leakage in the mobile computing device.

9. The system of claim 8 wherein the mobile computing device comprises a mobile phone.

10. The system of claim 8 wherein the mobile computing device creates the fake e-mail address to have a local-part that identifies the application and identifies the mobile computing device.

11. The system of claim 10 wherein the mobile computing device is identified in the local-part of the fake e-mail address by a user identifier.

12. The system of claim 8 wherein the mobile computing device includes the fake e-mail address in a contact list in the mobile computing device.

13. The system of claim 8 wherein the backend system hosts a mail server that receives the e-mail.

14. A computer-implemented method comprising:
    monitoring for a running of an application;
    detecting the running of the application;
    in response to detecting the running of the application, generating a fake e-mail address not belonging to a contact of a user of the computing device, the fake e-mail address being generated to have a local-part that identifies the detected running application and identifies the computing device;
    receiving an e-mail addressed to the fake e-mail address;
    parsing the local-part of the fake e-mail address to identify the application; and
    sending a notification to a user of the computing device.

15. The method of claim 14 further comprising:
    including the fake e-mail address in a contact list in the computing device.

16. The method of claim 14 wherein the e-mail is received in a backend system hosting a mail server.

17. The method of claim 16 wherein a domain name of the fake-email address is the domain name of the backend system.

18. The method of claim 14 wherein the local-part of the fake e-mail address identifies the computing device by a user identifier.

* * * * *